United States Patent Office 3,163,546
Patented Dec. 29, 1964

3,163,546
PROCESS FOR MAKING DEHYDRATED
POTATOES
Morton Pader, West Englewood, N.J., assignor to Lever
Brothers Company, New York, N.Y., a corporation of
Maine
No Drawing. Filed Apr. 25, 1961, Ser. No. 105,302
13 Claims. (Cl. 99—207)

This invention relates to an improved dehydrated mashed potato product and to a process for preparing the same. More particularly, the invention relates to dehydrated mashed potato flakes of superior quality, and to a process for preparing them.

This application is a continuation-in-part of application Serial No. 811,287, filed May 6, 1959, and now abandoned.

The problem of reducing potatoes to a stable dehydrated form has long been the subject of intensive research efforts by the food industry. The current processes generally include the steps of cooking the potatoes, mashing the cooked potatoes, and dehydrating the mash thus prepared. Dehydrated mashed potatoes have been prepared in several forms, including granules, porous extruded cylinders, and flakes.

Dehydrated potato granules are prepared by finely dividing wet mashed potatoes and introducing them into a stream of heated air. The stream of air serves the dual function of dehydrating the individual particles and transporting them to a collection station. The extruded cylinder form of dehydrated potatoes is generally prepared by whipping the mash, extruding it in a cylindrical shape and drying the potato in such a manner that the cylindrical shape is retained. The flakes are formed by drum drying a mash or a slurry of mashed potatoes.

In addition to the above described variations in process steps, some workers in the field employ additives to improve the quality of the reconstituted potatoes. Thus, the use of non-fat milk solids and mono glycerides at low levels has become a fairly widespread practice. Attempts to use higher levels of milk solids met with failure, however, since the addition of larger amounts of milk solids gave a glazed appearance and a cheese-like flavor to the reconstituted mashed potatoes. None of the prior art processes provides a product which on reconstitution results in a mashed potato having the same texture and flavor characteristics as freshly prepared mashed potatoes.

The major problems encountered in preparing a suitable dehydrated mashed potato product include the prevention of off-flavors, the retention of natural potato flavor, and the realization of an acceptable mealy texture and fresh mashed potato-like appearance in the reconstituted product. In addition, the bulk density of the dehydrated product is an important consideration from a packaging and a merchandising standpoint, and may have an important effect on the characteristics of the reconstituted product.

Off-flavors generally develop in dehydrated potatoes primarily because of two types of changes which take place during processing and storage. These are the development of a scorched, baked-potato-like flavor generally attributed to a reaction between sugars and nitrogenous substances such as proteins and amino acids in the potato, and oxidative changes. The rate and extent to which the off-flavors develop can be controlled to a substantial degree by reducing the moisture content of the dehydrated potatoes to a very low level, by the use of relatively mild processing conditions, by the addition of stabilizing agents, such as sulfite and anti-oxidants, and by storing the dehydrated product under conditions which retard chemical interactions. Dehydrated mashed potato products made by prior art processes, however, have shown the ability to resist off-flavor development only under special conditions of manufacture and storage, not practical for general marketing purposes.

In most of the prior art processes, the texture of the reconstituted product depends to a large extent upon the solids content of the potatoes employed in the process. Potatoes having upwards of 20% solids provide a reconstituted product of desirably mealy texture, provided appropriate precautions are observed during processing. Low solids content potatoes ranging from about 16.5 to about 19% solids generally provide a reconstituted product of a starchy, non-mealy texture, unless special processing conditions such as the combination of pre-cooking and pre-cooling are followed.

It has now been found that a highly acceptable dehydrated potato product can be prepared by cooking raw potatoes, mashing the cooked potatoes, and drying the potatoes, provided that a high level of a monoester of a polyhydric alcohol containing at least three hydroxyl groups and a saturated higher fatty acid is added to and thoroughly mixed with the cooked potatoes before drying. The level at which the monoester is employed should be from 1 to 5% by weight, based on the dry solids content of the cooked potatoes. Inclusion of the high level of monoester results in a dehydrated potato product which on reconstitution gives a product which has the texture and other characteristics of freshly prepared mashed potatoes. In many instances the quality of the reconstituted dehydrated product of this invention surpasses the quality of freshly prepared mashed potatoes of the same type.

In addition, it has been found that the quality of the reconstituted potato product is further improved by the addition of at least 0.3% of an edible protein material to the cooked potato before drying. The addition of the protein permits the use of a drum-drying operation where high levels of the monoester of a polyhydric alcohol and a saturated higher fatty acid are employed.

The dehydrated potatoes prepared according to this invention are substantially improved in quality over those presently available. They have a high bulk density, and have a highly acceptable texture and appearance when reconstituted.

According to the processes of preparing dehydrated potato flakes as outlined in United States Patents Nos. 2,780,552, 2,787,553, and 2,759,832, the mashed potato is dried in the form of a thin film having a thickness of from about 0.005 to about 0.015 inch, i.e., substantially of monocellular thickness. This is most conveniently carried out by drum drying techniques. At film thicknesses below this range, it is said that the starch granules tend to rupture during drying, releasing free starch and causing a starchy, pasty consistency in the reconstituted product. At film thicknesses above this range, the starch granules or cells tend to form agglomerates. These agglomerates do not reconstitute as quickly as the flakes of the preferred thickness and may provide a grainy consistency to the reconstituted product. Furthermore, the thicker films are more difficult to dry, and generally have a higher moisture content, thus rendering them more unstable in storage, unless a further drying step is employed.

In the processes of this invention, the dried film is not necessarily monocellular, although a thickness of about .001 to about .02 inch is preferred. These products are obtained when from 1 to 5%, preferably 1.5 to 3%, of an edible monoester of a polyhydric alcohol containing at least three hydroxyl groups and a higher fatty acid is added to the cooked potatoes and mixed therewith prior to the drying step. In addition, it is generally preferred to add at least 0.3% of an edible protein material with the monoester. The dehydrated flakes thus obtained may be reduced in size to provide a product of substantially greater bulk density than the products obtained by the processes of the above patents, while at the same time providing a reconstituted product of exceptionally fine quality.

As a further modification, it has been found possible in some instances to use a substantially greater film thickness in the process of the patents listed above, without sacrifice of desirable rehydration properties.

The edible monoesters of a polyhydric alcohol and a saturated higher fatty acid which may be employed according to this invention include monoesters of glycerine and a higher fatty acid, such as glyceryl monostearate and glyceryl monopalmitate. While it is generally preferred that monoesters of saturated fatty acids be employed, a small degree of unsaturation in mixtures where saturated monoesters predominate is permissible.

Examples of commercially prepared products suitable for use according to this invention include Myverol 18–00, produced by Distillation Products Industries, which has a monoglyceride content of about 95% and which is a substantially pure molecularly distilled fraction of fully hydrogenated lard, and Myverol 16–00, which is essentially glyceryl monopalmitate. Myverol 18–85 of the same manufacturer, a molecularly distilled fraction of refined cottonseed oil having a monoglyceride content of about 95% will impart desirable mealiness to the reconstituted mash, but the fluffiness and other characteristics of freshly mashed potatoes will not be as fully developed as when substantially completely hydrogenated glycerides are used. Mixtures of monoglycerides and diglycerides may be employed at a level calculated on the basis of the monoglyceride content of the mixture, although less desirable results are obtained. The diglyceride tends to impart an undesirable appearance to the reconstituted product.

As aforementioned, the monoesters are employed at the relatively high level of from 1 to 5% based on the solids content of the cooked potatoes, and preferably 1.5 to 3%. While use of the monoesters at a relatively low level, such as 0.25% on the same basis, is well known in the art, the use of high levels of these materials is believed to be new. The exceptional improvement in product quality is completely unexpected.

The edible protein employed according to this invention may be sodium, calcium or potassium caseinate, whole milk solids, skim milk solids, isolated soy bean protein, and the like. The edible protein improves the drum drying characteristics of the mashed potato containing the higher levels of monoester within the range indicated above. Drum-drying of cooked, mashed potatoes containing relatively high levels of glyceryl monostearate is difficult because the wet mash does not adhere in a satisfactory manner to the drying drum. This deficiency is corrected by adding an edible protein to the potatoes before drum-drying. The adherence of the sheet of dried potatoes to the drying drum is vastly improved, thereby increasing the heat transfer between the drum and sheet. This use of an edible protein also serves to increase the rate of production of the drum-dried product since the sheet is dried more rapidly.

The level of protein additive which should be employed depends on a number of variables, including the level of monoester and the solids content of the raw potatoes used. For practical reasons, when the edible protein is added solely to improve the drum-drying characteristics of the mashed potatoes, the level of protein is usually about 0.3–5%. Where the edible protein comprises milk solids, however, it may be added in amounts of from about 0.3% to about 16% and more, since the milk imparts other advantages to the mash as will be pointed out.

A very important feature of the invention resides in the discovery that the procedure utilized in reconstituting the potato flakes is not critical. Prior attempts to reconstitute potato flakes with boiling liquids have been unsuccessful since the hot liquid ruptured the starch globules and released free starch thus giving a pasty non-mealy appearance to the mash. The recommended procedure for reconstituting dehydrated potatoes has involved the addition of hot liquids (at about 160° F.) made by mixing one part cold milk with three parts boiling water.

Unexpectedly it has now been found that mash containing 1–5% of an edible monoglyceride may be reconstituted with boiling water alone thereby yielding much hotter reconstituted potatoes. It appears that the presence of the edible monoglyceride at high levels in some manner prevents the migration of free starch into the mash.

As pointed out previously, the addition of at least 0.3% of an edible protein is advantageous where the cooked potatoes are to be drum dried. When the protein comprises milk solids, it has been discovered that relatively large amounts of this protein can be tolerated in the mash if high levels of monoglyceride are also used. Since the higher proportions of milk solids represent the amount usually recommended for reconstituting potato flakes, a resulting mash can be reconstituted with boiling water and without the further addition of milk. Thus, very hot reconstituted mashed potatoes of excellent taste and texture can be readily obtained by the addition of boiling water to potato flakes containing high levels of both an edible monoglyceride and skim or whole milk solids.

The stability of the flakes in storage was not affected by the addition of a high level of milk solids. Surprisingly, it appears that the presence of a high level of monoglyceride enables the potato flakes to withstand the high proportion of milk solids without evidencing undesirable changes. Furthermore, where the processing of potato flakes involves the addition of a sulfite stabilizer, it has now been found that much larger amounts of sulfite can be tolerated in potato flakes containing high levels of monoglycerides and milk solids. This is important in controlling the development of off-flavors in the product during storage since the stabilizer is a more effective retardant when used at higher levels.

Another advantage of the invention is that the procedure employed in cooking the potatoes prior to mashing is not critical. The potatoes may be peeled and then placed in boiling water or steam until completely cooked. An alternative procedure involves precooking the sliced potatoes such as by heating in water at about 160°–170° F. prior to cooking in boiling water or steam.

Still another means for preparing dehydrated potatoes containing high levels of monoglycerides involves the use of a precooling step. After precooking the potatoes as explained previously, the slices are drained and placed in water at about 70° F. for approximately 20 minutes before being finally cooked in steam or boiling water. Regardless of the particular method employed in preparing the flaked product, the reconstituted potatoes will always have an acceptable flavor, appearance and texture so long as a high level of edible monoglyceride is added prior to drying.

It will be realized, of course, that although precooking and precooling are unnecessary, these steps may be desirable in some instances. For example, where the monoglyceride and milk solids are both present in high levels, the use of precooking and precooling procedures would be desirable. It is indeed surprising, however, to discover that the presence of 1–5% of an edible monoglyceride yields excellent reconstituted mashed potatoes independent of the particular method employed in cooking the potatoes prior to dehydration.

It is preferred, however, that the raw potatoes be cut into slices ranging from about one-half to one inch thick so that the cooking time may be reduced and the potatoes cooked in a uniform manner.

The advantages of being able to cook the potatoes in boiling water are several. For one, dehydrated mashed potato flakes made from tubers which have been cooked in boiling water rather than in steam are more resistant to the development of off-flavors during storage. Secondly, the potatoes are softened during cooking to an extent such that they can be mashed readily using only the mixing necessary to incorporate the additives, the special mashing or ricing operation, which is critical in prior art processes is eliminated. Thirdly, dehydrated mashed potato flakes processed in accordance with the invention from tubers cooked in water reconstitute to mash with desirably increased whiteness, opacity, and over-all fresh mashed potato appearance compared to flakes prepared from steam-cooked potatoes.

One of the advantages of this invention is that no precooking step, such as that described in United States Patent No. 2,787,553, is required. The teachings of the patent are to the effect that without a precooking step, the preparation of a dehydrated potato flake which will reconstitute to a mash of acceptable mealiness will not be assured. Unexpectedly, the process of this invention results in an improvement in mealiness which is greater than that obtained by using a precooking step.

An additional and very important advantage of this invention is that an acceptably mealy texture is assured in the reconstituted product regardless of the solids content of the raw potatoes employed. By means of the techniques described in the following examples, high bulk density flakes which reconstituted to mash with good mealiness and appearance were prepared from Russet Burbank potatoes obtained from Maine and Idaho ranging in total solids content from about 17% to about 24%, from California potatoes (not Russet Burbank) containing about 22% solids, and from Virginia potatoes (variety not known, but not Russet Burbank) containing 16.6% solids.

The following examples illustrate the process and product of this invention.

EXAMPLE 1

Russet Burbank potatoes containing 21.7% total solids were peeled in an abrasion peeler and trimmed. The potatoes were then sliced into pieces about 3/4 inch thick, washed, and placed in boiling water. The water was maintained at a very gentle boil for thirty-five minutes. At the end of this time, the cooked potatoes were drained of excess water and gently mashed in a Hobart mixer by mixing at low speed. After mashing was nearly complete, the following materials were added.

| Additive: | Percent basis mash solids |
|---|---|
| Myverol 18–00 | 2.0 |
| Non-fat milk solids | 1.0 |
| Tenox IV | 0.05 |
| $SO_2$ | 0.05 |

The Myverol 18–00 is a molecularly distilled fraction of fully hydrogenated lard sold by Distillation Products Industries, and contains approximately 95% of monoglyceride. The Tenox IV is a food grade antioxidant, sold by the Eastman Kodak Company containing 20% butylated hydroxyanisole and 20% butylated hydroxytoluene as active ingredients. The $SO_2$ in the above table is added as a mixture of 7.5 parts $Na_2SO_3$ and 2.5 parts $NaHSO_3$ in aqueous solution.

Mixing was continued until the mash took on a whitish, whipped appearance. The mash was then dried as a film on a single drum drier, 18 inches long and 12 inches in diameter at 40 p.s.i.g. steam pressure. A continuous, dense, uniform dehydrated sheet averaging about 0.007 inch thick was obtained containing about 7% moisture.

The sheet was broken up crudely by hand and then comminuted in a comminuting mill equipped with sharpened blades and a one-quarter inch mesh screen. The comminuted product had a bulk density of 18 pounds per cubic foot.

The dehydrated potato flakes prepared above were reconstituted as follows: 1½ cups water containing ½ teaspoon salt was brought to a boil and removed from the flame. ½ cup of milk was added immediately to the water, followed by 0.2 pound of flakes. The mixture was allowed to stand for about one minute and then mashed with a fork. The reconstituted mashed potato product had a desirably mealy and firm texture and an excellent flavor. It was very much like fresh whipped potatoes in appearance and was not starchy either in taste or appearance.

EXAMPLE 2

Dehydrated potato flakes were prepared as in Example 1 except that glyceryl monopalmitate was substituted for Myverol 18–00 on an equal weight basis and a 7/32 inch punched hole screen was used on the comminutor in place of the 1/4 inch mesh screen. The flakes had a bulk density of 21 pounds per cubic foot. On reconstitution of the flakes, according to the procedure set forth in Example 1, a mashed potato product was obtained which was nearly identical in texture, flavor and appearance to the product obtained according to the process of Example 1.

Two additional batches of potato flakes were also prepared as in Example 1, except that (1) Myverol distilled monoglycerides, Type 18–85, obtained by molecular distillation of refined cottonseed oil monoglycerides, and (2) a mixture of glycerides containing about 40% monoglycerides and about 60% diglycerides, prepared from hydrogenated cottonseed oil, were each substituted in turn for Myverol 18–00.

The reconstituted product obtained from the mash containing Myverol 18–85, (1) produced an acceptably mealy product of satisfactory taste and appearance. It was not of the same high quality as the product obtained by using Myverol 18–00. This was apparently due to the fact that Myverol 18–85 is not fully saturated.

The mixture of mono- and diglycerides, (2) was substituted on an approximately equal monoglyceride weight basis. The dehydrated potato flakes obtained reconstituted to a mashed potato having good mealiness and freedom from starchiness, but with somewhat inferior appearance with respect to opacity, lack of gloss, and the like.

EXAMPLE 3

The following example clearly demonstrates the improvement over prior art processes obtained by using a level of monoglyceride within the range of this invention.

Russet Burbank potatoes containing 17.9% total solids were abrasion-peeled, trimmed, cut into 5/8 inch thick slices and washed with water. The slices were precooked in water at 70° C. for twenty minutes, and then cooked for thirty minutes in steam at atmospheric pressure. The cooked tubers were then riced by means of a device which forced them through a plate perforated with 1/4 inch diameter holes. The mash thus prepared was divided into two parts.

Part A

To one part of the mash the following materials were added:

| Additive: | Percent basis mash solids |
|---|---|
| $SO_2$ | 0.05 |
| Tenox VI | 0.08 |
| Skim milk powder | 0.2 |
| Myverol 18–00 | 0.2 |

The $SO_2$ and Myverol 18–00 are the same as those described in Example 1. Tenox VI is an Eastman Kodak food grade antioxidant having the following composition:

| | Percent |
|---|---|
| Butylated hydroxyanisole | 10 |
| Butylated hydroxytoluene | 10 |
| Propyl gallate | 6 |
| Citric acid | 6 |
| Propylene glycol | 12 |
| Vegetable oil | 56 |

The mash was gently mixed for five minutes and drum-dried at 50–55 p.s.i.g. steam pressure. A good sheet of dehydrated mashed potatoes was obtained. This was comminuted in a mill equipped with sharpened blades and a screen perforated with ⅝ inch square holes. The bulk density of the flakes obtained was 11.6 pounds per square inch. Part of these flakes were screened through a 7-mesh sieve. The material passing through the screen had a bulk density of 21.6 pounds per cubic foot. On reconstitution as in Example 1, the 11.6 pounds per cubic foot material gave a mash with a somewhat mealy but slightly starchy texture and a slightly glossy appearance. Its flavor was relatively strong. Over-all, however, this mash was considered to be acceptable. The mashed potatoes obtained with the 21.6 pounds per cubic foot flakes were of poor quality. They were very starchy, lacked mealiness, and had a glossy appearance. The product was considered to be unacceptable.

*Part B*

To the other half of the mash obtained previously, the following materials were added.

| Additive: | Percent basis mash solids |
|---|---|
| SO$_2$ | 0.05 |
| Tenox VI | 0.08 |
| Skim milk powder | 2.0 |
| Myverol 18-00 | 2.0 |

The additives were as defined in Part A above. This mash was converted to flakes in the same manner as in Part A. Two fractions of flakes were prepared, again according to the procedure of Part A. The two fractions had bulk densities of 10.2 and 18.6 pounds per cubic foot, respectively. Both fractions yielded excellent mashed potatoes on reconstitution. Both had excellent texture and appearance. They were not glossy but had a whipped texture, were relatively white, opaque, and had a desirably mealy texture. The high bulk density product was slightly firmer, but otherwise identical with the low bulk density product.

This example demonstrates that the use of high levels of monoglyceride according to this invention results in reconstituted mashed potatoes of greatly improved texture and appearance. In addition, it also demonstrates that the bulk density of potato flakes obtained according to this invention can be increased without sacrifice of product quality.

EXAMPLE 4

Potato flakes were prepared as in Example 1, but only 0.2% Myverol 18-00 and 0.2% skim milk powder were added in place of the amounts given. A good sheet was obtained off the drum drier, and was divided into two equal parts. Part A was broken into fairly large pieces and Part B was comminuted as in Example 1. Both Part A and Part B were reconstituted as in Example 1. The mashes obtained had poor texture, they were not adequately mealy, and were somewhat starchy, especially Part B, the higher bulk density product.

This test demonstrates that the use of a high level of a monoester permits the use of potatoes cooked in boiling water, and obtention of the advantages attainable thereby.

EXAMPLE 5

Michigan Russet Rural potatoes containing 20% total solids were peeled, trimmed, sliced and dipped in a solution containing 0.5% each of NaHSO$_3$ and citric acid. The sliced potatoes were precooked for 20 minutes in hot water (160° F.) followed by cooling in running cold tap water for 20 minutes. The slices were then transferred to wire baskets and cooked for 35 minutes in steam at atmospheric pressure. Thirty pounds of the cooked potatoes were placed in a Hobart mixer bowl and mashed at low speed for about 1 minute. The following ingredients were then added, based on dry weight of the potatoes.

| Additive: | Percent basis mash solids |
|---|---|
| Sulfite (as SO$_2$) [1] | 0.05 |
| Butylated hydroxyanisole [2] | 0.01 |
| Butylated hydroxytoluene [2] | 0.01 |
| Skim milk powder | 9.0 |
| Monoglyceride (Myverol 18-07) | 0.2 |

[1] Prepared as in Example 1 (500 p.p.m.).
[2] Added as Tenox IV, an Eastman Kodak Company product.

Mixing was continued for 5 minutes at low speed for complete incorporation of the additives. The still hot mash was applied to a single drum drier and dried under conditions of drum speed and temperature such that a sheet was obtained about 0.008–0.01 inch thick and containing 7–8% moisture. The sheet was broken into flakes having a bulk density of about 20 lbs./cu. ft. by means of a Fitzpatrick Model D comminuting mill equipped with blades rotating at 450 r.p.m. and a ¼ inch mesh wire screen.

The potato flakes were reconstituted by adding 2 cups of boiling water containing ½ tsp. salt to 103 grams of flakes in a bowl, adding 1 tbsp. margarine, waiting until the water was absorbed (½–1 minute), and whipping with a fork.

The reconstituted product was quite glossy in appearance and somewhat pasty in texture; it also lacked adequate mealiness. This was in contrast to the product obtained from the same lot of potatoes by the conventional procedure, i.e., drum-drying a mash containing only about 0.2% skim milk solids (basis mash solids) and reconstituting with fluid, including milk, at about 160° F. The mash from the conventional flakes was quite acceptable in both appearance and texture.

This example demonstrates the inability of obtaining acceptable reconstituted potatoes by adding boiling water to flakes containing a high level of skim milk solids but a low level of monoglyceride.

EXAMPLE 6

Potato flakes were prepared in the same manner as described in Example 5 except for an increase in the monoglyceride level to 1%. The product, reconstituted with boiling water, as in Example 5, was steaming hot, and had a fresh, boiled-potato-like appearance and a non-starchy, non-pasty, desirably mealy texture.

Thus, elevation of the monoglyceride level surprisingly eliminated the harmful effects of the high level of skim milk powder, and gave an acceptable reconstituted product.

EXAMPLE 7

Potato flakes were prepared as described in Example 5, except for an increase of the monoglyceride level to 2%. Upon reconstitution, they were like the product obtained in Example 6.

EXAMPLE 8

Potato flakes prepared from Michigan Russet Rurals as described in Example 5 were dried to a moisture level of 5.6% in a Procter & Schwartz tunnel drier (set at 120° F.). Control potato flakes, prepared by the conventional procedure, i.e., with about 0.2% monoglyceride and 0.2% skim milk powder, were similarly dried to a moisture content of 5.8%. These samples were packed in tin cans in air and under nitrogen, and stored at 130° F., 105° F., and room temperature. All the 130° F. samples, after 3 days of storage, were found acceptable in terms of texture, color and flavor. After storage for 2 weeks at 105° F. or 1 month at room temperature, both the high milk and control samples had acceptable flavor, color and texture. Thus, surprisingly, storage stability was not appreciably affected by the high level of skim milk solids.

EXAMPLE 9

Potato flakes were prepared as described in Example 5 but with increasing sulfite levels. The levels chosen were 600, 800, 1000 and 1200 p.p.m. With the presence of high skim milk solids, the potato flakes exhibited no sulfite off-flavor even though approximately 50% of the initial sulfite remained in the final product.

EXAMPLE 10

*Pilot-Plant Preparation of High Monoglyceride-High Skim Milk Solids Flakes*

Russet rural potatoes containing 20% solids were abrasion-peeled, trimmed, cut into ½ inch thick slices, dipped in a citric acid-sulfite solution, and kept in warm water (160° F.) for 20 minutes. The precooked slices were drained and placed in cold water (70° F. or lower) for 20 minutes, after which they were put into trays in a 2 inch deep layer and steam cooked (212° F.) for 30 minutes. Thirty pounds of the cooked slices were mashed in a paddle mixer and blended with the following additives:

| Additive | | |
|---|---|---|
| Skim milk powder | gm | 270 |
| Myverol 18–07 | gm | 27 |
| Tenox IV | gm | 1.6 |
| Sulfite sol.[1] | cc | 37 |
| Water | cc | 500 |

[1] 7.5% $Na_2SO_3$, 2.5% $NaHSO_3$ in water (wt./vol.).

Drum drying conditions were similar to those described in Example 1. A sheet 0.008 inch thick was obtained.

The sheet was comminuted with a Fitzpatrick Model D comminuting mill equipped with a ¼ inch mesh screen.

To reconstitute the flakes, 2 cups of water and ½ tsp. salt were brought to a boil and removed from the heat. One tbsp. margarine and 0.23 lb. flakes were added immediately and mixed with a fork to wet all the flakes. When the water had been absorbed completely (in less than ½ minute), the potatoes were whipped with a fork. They had excellent flavor, texture, and appearance, and were always at a temperature over 190° F. in contrast to the temperature of potatoes reconstituted with milk and water, which generally were at about 160° F.

EXAMPLE 11

*Plant Production of High Monoglyceride-High Skim Milk Solids Flakes*

Russet rural potatoes containing about 20% total solids were subjected to conventional methods of continuous desprouting, stone removal, washing, peeling and trimming. The trimmed potatoes were dipped in citric acid-sulfite solution, sliced ½ inch thick, precooked on a moving belt in water at 170° F. for 20 minutes, cooled on a moving belt in a tank of water at 45° F. for 20 minutes, and cooked in a continuous steam cooker at 212° F. for 45 minutes. The additives utilized were:

| Additive: | Gm./lb. mash |
|---|---|
| Skim milk powder | 10.9 |
| Myverol 18–00 | 1.1 |
| Tenox IV | 0.05 |

The sulfite solution, a 10% (wt./vol.) solution of $Na_2SO_3$—$NaHSO_3$ (3:1), was metered into the potatoes carried in a worm conveyor just prior to drum-drying on a single drum drier 3½ feet in diameter and 10 feet in length with four applicator rolls. A steam pressure of 60 p.s.i. was supplied to the drum which rotated at a speed of 1.7 r.p.m. The dehydrated potato sheet averaged 0.008 inch thick; its moisture content averaged about 6%. The sheet was broken in a trough containing a screw which moved the product to a hammer mill equipped with a ¼ inch mesh screen.

The flakes were reconstituted in several ways, all of which yielded mashed potatoes with excellent flavor, texture, and appearance. In one trial, the flakes (0.225 lb.) were reconstituted with 2 cups of boiling water. In another, 0.21 lb. of flakes was reconstituted with 1½ cups boiling water to which had been added ½ cup cold milk. In a third, 0.21 lb. of flakes was reconstituted with 1¾ cups boiling water +¼ cup cold milk. The last reconstituted mash was intermediate in temperature between the first two. The last two mashes had substantially more milk solids than prior art reconstituted flakes, and thus had greater nutritional value.

It was found that the mash described in this example could be drum-dried on the 10 ft. drum drier at a rate more than 25% faster than that of prior art mashed potatoes because of exceptionally good adhesion of mash to the drum surface.

EXAMPLE 12

*Pilot Plant Preparation of High Monoglyceride-High Whole Milk Flakes*

Russet rural potatoes were abrasion-peeled, trimmed, sliced, heated in water at 170° F., cooled in water and steam-cooked as in Example 10. To the cooked potatoes, mashed by means of a paddle mixer, the following were added (finished flake basis):

| | Percent |
|---|---|
| Whole milk powder | 15.6 |
| Myverol 18–07 | 1.0 |
| Tenox IV | 0.05 |

Sulfite solution (see Example 1) to give a flake level of about 250 p.p.m. $SO_2$.

The mash was mixed gently to insure uniform distribution of the additives and drum-dried employing the conditions described in Example 1. Despite the presence of a substantial amount of fat in the mash, a sheet was obtained without undue difficulty.

The sheet obtained was comminuted in a Fitzpatrick Model D comminuting mill through a ¼" mesh screen.

The product was reconstituted by adding it to boiling water (removed from flame). For each 0.24 lb. of flakes, 2 cups of boiling water (containing ½ tsp. salt) were used. Margarine was added, and after about 30 seconds, the mash was whipped with a fork. It was excellent with respect to flavor, texture, and appearance.

EXAMPLE 13

*Pilot Plant Preparation of High Monoglyceride-High Milk Flakes: Simplified Cooking of the Potatoes*

Russet rural potatoes containing 20% solids were abrasion-peeled, trimmed, cut into ½ inch thick slices and dipped in a citric acid-sulfite solution for 30 seconds. The slices were put into wire baskets and steam-cooked (212° F.) for 35 min. The cooked slices (30 lbs.) were mashed for 1 minute in a Hobart paddle mixer at low speed. To this mash was added:

| | Level, basis dehydrated product |
|---|---|
| Non-fat milk solids | 280 gm. (8.8%). |
| Myverol 18–07 | 54 gm. (2%). |
| Tenox IV | 1.6 gm. |
| Water | 500 gm. |
| Sulfite solution | 37 cc. (see Example 10). |

Mixing was continued for 5 minutes, after which the mash was applied to a single drum drier (Buflovax), 18 inches long and 12 inches in diameter. Using a drum clearance of 0.1 inch and a steam pressure of 30 p.s.i.g., a continuous, dense, uniform dehydrated sheet averaging 0.010–0.012 inch thick was obtained containing about 8% moisture. The sheet was comminuted with a Fitzpatrick Model D mill equipped with ¼ inch mesh screen.

The dehydrated potato flakes prepared above were reconstituted as follows: 2 cups of water containing ½ teaspoon salt were brought to a boil and removed from the flame. Two tablespoons of butter and 101 gm. of flakes were immediately added. The mixture was allowed to stand for 1 minute and then whipped with a fork. A product of excellent flavor and texture was obtained. This was further evidence that with the use of these additives, both the procedure employed in cooking prior to mashing and the reconstitution conditions were not critical.

When flakes were prepared in the same way but with only prior art amounts of additives, the flakes obtained yielded a product which was starchy and pasty, not at all like mashed freshly-cooked potatoes.

EXAMPLE 14

*Pilot Plant Preparation of High Monoglyceride High Casein Flakes*

Flakes were prepared from Russet Burbanks (Maine) as in Example 1 except that the potatoes were cooked only 25 minutes and the non-fat milk solids were replaced with 0.8% sodium caseinate. An excellent sheet was obtained, which after comminution and reconstitution as described in Example 1, yielded excellent mash with respect to flavor, appearance, and texture.

EXAMPLE 15

Russet Rural potatoes were cooked and mashed as described in Example 10. The following were added per 30 lbs. of mash:

| | | |
|---|---|---|
| Soybean protein [1] | grams | 28 |
| Myverol 18-07 | do | 42 |
| Tenox IV | do | 1.6 |
| Sulfite solution | ml | 37 |

[1] Isolated soy protein spray dried at about neutral pH.

Drum-drying conditions were as in Example 1. An excellent, dense, uniform sheet of dehydrated product was obtained, averaging 0.0074 inch thick. The sheet was comminuted in a Fitzpatrick Model D mill equipped with a ¼ in. mesh screen.

The flakes were reconstituted by bringing 1½ cups of water to a boil, removing from the heat, adding ½ tsp. salt, 2 tbsp. margarine, ½ cup milk, and then 0.20 lb. of flakes. The mixture was stirred to wet all the flakes, allowed to stand one minute, and then whipped with a fork. The reconstituted product was creamy, and had excellent flavor and texture.

When the flakes were reconstituted with boiling water they yielded an acceptable mash, but this mash was considered poorer in texture than, for example, the reconstituted mash of Example 10.

It is understood that the foregoing examples are illustrative only and that modifications will occur to those skilled in the art. Therefore, the invention is not to be limited thereto but is to be defined by the appended claims.

I claim:

1. In a process for producing dehydrated potatoes comprising the steps of cooking raw potatoes, mashing the cooked potatoes and drying the potatoes by applying a film thereof to a heated surface, the improvement comprising the steps of adding to the cooked potatoes, before drying, from 1 to 5% of a monoester of glycerine and a higher fatty acid, and improving the adherence of the potato film to the heated surface by adding from about 0.3% to about 16% of an edible protein to the cooked potatoes, said percentages being by weight based on the dry solids content of the cooked potatoes.

2. The process of claim 1 wherein the edible protein consists of skim milk solids.

3. The process of claim 1 wherein the edible protein consists of whole milk solids.

4. The process of claim 1 wherein the monoester is a substantially pure molecularly distilled monoglyceride fraction of fully hydrogenated lard.

5. The process of claim 1 wherein the monoester is glyceryl monopalmitate.

6. In a process for producing dehydrated potatoes comprising the steps of cooking raw potatoes, mashing the cooked potatoes and applying a film of the mashed potatoes to a heated surface to reduce the moisture content of the film to from about 5 to about 10% by weight, the improvement comprising the steps of adding to the cooked potatoes, before drying, from about 0.3 to about 16% of an edible protein selected from the group consisting of casein and soy protein, and from 1.5 to 3% of a monoester of glycerides and a higher fatty acid, said percentages being by weight based on the dry solids content of the cooked potatoes.

7. The process of claim 6 wherein the protein is casein and the monoester is a substantially pure molecularly distilled monoglyceride fraction of fully hydrogenated lard.

8. A process for producing dehydrated potatoes comprising the steps of cooking the potatoes in water at a temperature and for a time sufficient to completely cook the potatoes, draining the potatoes, mashing the cooked potatoes, and applying a film of the mashed potatoes to a heated surface to reduce the moisture content of the film to from about 5 to about 10% by weight, the cooked potatoes before drying being uniformly mixed with from about 0.3% to about 16% of an edible protein selected from the group consisting of casein and soy protein, and from 1.5 to 3% of a monoester of glycerine and a saturated higher fatty acid, said percentages being by weight based on the dry solids content of the cooked potatoes.

9. The process of claim 8 wherein the edible protein consists of skim milk solids.

10. The process of claim 8 wherein the edible protein consists of whole milk solids.

11. In a process for producing dehydrated potatoes comprising the steps of precooking the raw potatoes in warm water, precooling the precooked potatoes in cold water, completing the cooking of the potatoes, mashing the cooked potatoes and drying by applying a film of the potatoes to a heated surface, the improvement comprising adding to the cooked potatoes before drying, from 1 to 5% of a monoester of glycerine and a saturated higher fatty acid, and improving the adherence of the potato film to the heated surface by adding from about 0.3% to about 16% of an edible protein to the cooked potatoes, said percentages being by weight based on the dry solids content of the cooked potatoes.

12. The process of claim 11 wherein the edible protein consists of skim milk solids.

13. The process of claim 11 wherein the edible protein consists of whole milk solids.

References Cited in the file of this patent

"Potato Flakes—a New Form of Dehydrated Mashed Potatoes," ARS 73-2, USDA Agricultural Research Service, 5 pages text, pages 1 to 3 relied on, November 15, 1954.

Talbert et al.: "Potato Processing," April 23, 1959, Avi Publishing Co., Westport, Conn., pages 332–335.